United States Patent [19]
Satoh et al.

[11] Patent Number: 5,469,418
[45] Date of Patent: Nov. 21, 1995

[54] OPTICAL INFORMATION WRITE/READ DEVICE AND METHOD FOR WRITING DATA

[75] Inventors: Isao Satoh, Neyagawa; Yuji Takagi, Hirakata; Yuji Hisakado, Neyagawa, all of Japan

[73] Assignee: Matsushita Electric Industrial Co., Ltd., Osaka, Japan

[21] Appl. No.: 91,276

[22] Filed: Jul. 15, 1993

[30] Foreign Application Priority Data

Jul. 16, 1992 [JP] Japan ................... 4-189203

[51] Int. Cl.⁶ ................................................. G11B 7/00
[52] U.S. Cl. .............................. 369/54; 369/32; 369/111
[58] Field of Search ........................ 369/54, 58, 32, 369/48, 50, 111, 124; 360/53, 77.05, 73.03.31

[56] References Cited

U.S. PATENT DOCUMENTS

| | | | |
|---|---|---|---|
| 3,805,284 | 4/1974 | Coon, Jr. et al. | 360/53 X |
| 4,873,679 | 10/1989 | Murai et al. | 369/32 |
| 5,128,946 | 7/1992 | Ogino et al. | 369/58 X |
| 5,239,424 | 8/1993 | Hasegawa et al. | 360/53 |
| 5,253,242 | 10/1993 | Satoh et al. | 369/54 |
| 5,255,270 | 10/1993 | Yanai et al. | 369/58 X |

*Primary Examiner*—W. R. Young
*Attorney, Agent, or Firm*—Wenderoth, Lind & Ponack

[57] ABSTRACT

A write/read device includes two optical heads for writing data on an optical disk. The two heads are moved simultaneously after data is written in a track, the written data is read and checked for writing errors. This write verify is performed by the two optical heads in parallel, and data can be written on an optical disk at a fast rate.

16 Claims, 6 Drawing Sheets

5,469,418

OPTICAL INFORMATION WRITE/READ DEVICE AND METHOD FOR WRITING DATA

BACKGROUND OF THE INVENTION

1. Field of the Invention

The present invention relates to an optical information write/read device which writes data in a write verify mode and a writing method therefor.

2. Description of the Prior Art

Recently, optical disks have attracted attention as a high density write/read medium, and they have been developed intensively. An optical disk has remarkable characteristics such as a large storage capacity, non-contact write/read capability and removal of record medium capability. In a prior art write/read device, an optical head writes and reads data with an optical beam in sectors in tracks provided on an optical disk.

However, at present, a so-called write verify is usually needed in order to ensure the reliability of written data by comparing the data read just after the write operation with the original write data or by counting the number of errors or the like detected from error correction signals.

FIG. 1 is an example of a timing chart of a write verify operation of a prior art write/read device. Write data stored in a buffer memory is coded by an error correction circuit, and modulated by a MODEM and written by an optical head in the data fields of each sector of tracks of a side of an optical disk. First, a first piece of data is written in a track "i", and after a revolution (wait) period T of the optical head, the data written in the track "i" is read for verification. The read signal is stored in the buffer memory after demodulation and error detection. If the number of errors is smaller than a prescribed number, the write operation is determined to have been properly performed and writing of the next piece of data is started. The above-mentioned series of write, read and error check is called a write verify, and the write verify of a track of data needs 3 T time periods wherein T denotes a disk revolution time. Following the write verify of the first piece of data, the next piece of data is written in the next track "i+1", and similarly to the data write operation in the track "i", after a rotation, the data written in the track "i+1" is read and checked for write verify. If more than the prescribed number of errors are detected, the data is again written in the same track or alternately written in another good track.

As illustrated in FIG. 1, if the write operation is performed in a write verify mode as explained above, a time period as long as three revolutions (3 T) is needed for the writing of a track. That is, the time period is three times as long as that of a write operation only, and data cannot be written fast.

SUMMARY OF THE INVENTION

An object of the present invention is to provide an optical information write/read device optical information which can write data fast and a write method therefor.

A write/read device according to the present invention comprises first and second optical head means for writing and reading data on an optical disk. A first servo means focuses an optical beam generated by the first optical head on a first record side of an optical disk, and a first data write means writes data on the first record side. A first data verify means reads the data written by the first data write means and checks for errors in the written data. On the other hand, the second optical head means is arranged at an opposite side to the first optical head means with respect to the optical disk. A second servo means focuses an optical beam from the second optical head on a second record side of the optical disk, and a second data write means writes data on the second record side. A second data read and check means reads the data written by the second data write means and checks for errors of the written data. A control means makes the first data read and check means check for errors while the second data write means writes data or the control means makes the second data read and check means check for errors while the first data write means writes data.

A method for writing data in a double-sided optical disk according to the present invention comprises four steps. In a first step, data is written with a first optical head on a first record side of an optical disk, and in a second step, the data written by the first optical head is read with the first optical head and the quality of the recorded data checked. In a third step, data is written with a second optical head in a second record side of the optical disk, and in a fourth step, the data written by the second optical head is read with the second optical head and the quality of the recorded data is checked. The first step using the first optical head is performed simultaneously with the fourth step using the second optical head or the third step using the second optical head is performed simultaneously with the second step using the first optical head.

An advantage of the present invention is that information can be written fast in an optical disk in a write verify mode.

BRIEF DESCRIPTION OF THE DRAWINGS

These and other objects and features of the present invention will become clear from the following description taken in conjunction with the preferred embodiments thereof with reference to the accompanying drawings, and in which:

FIG. 5 comprises FIG. 5(a) and FIG. 5(b)

DETAILED DESCRIPTION OF THE PREFERRED EMBODIMENTS

Figure 2:
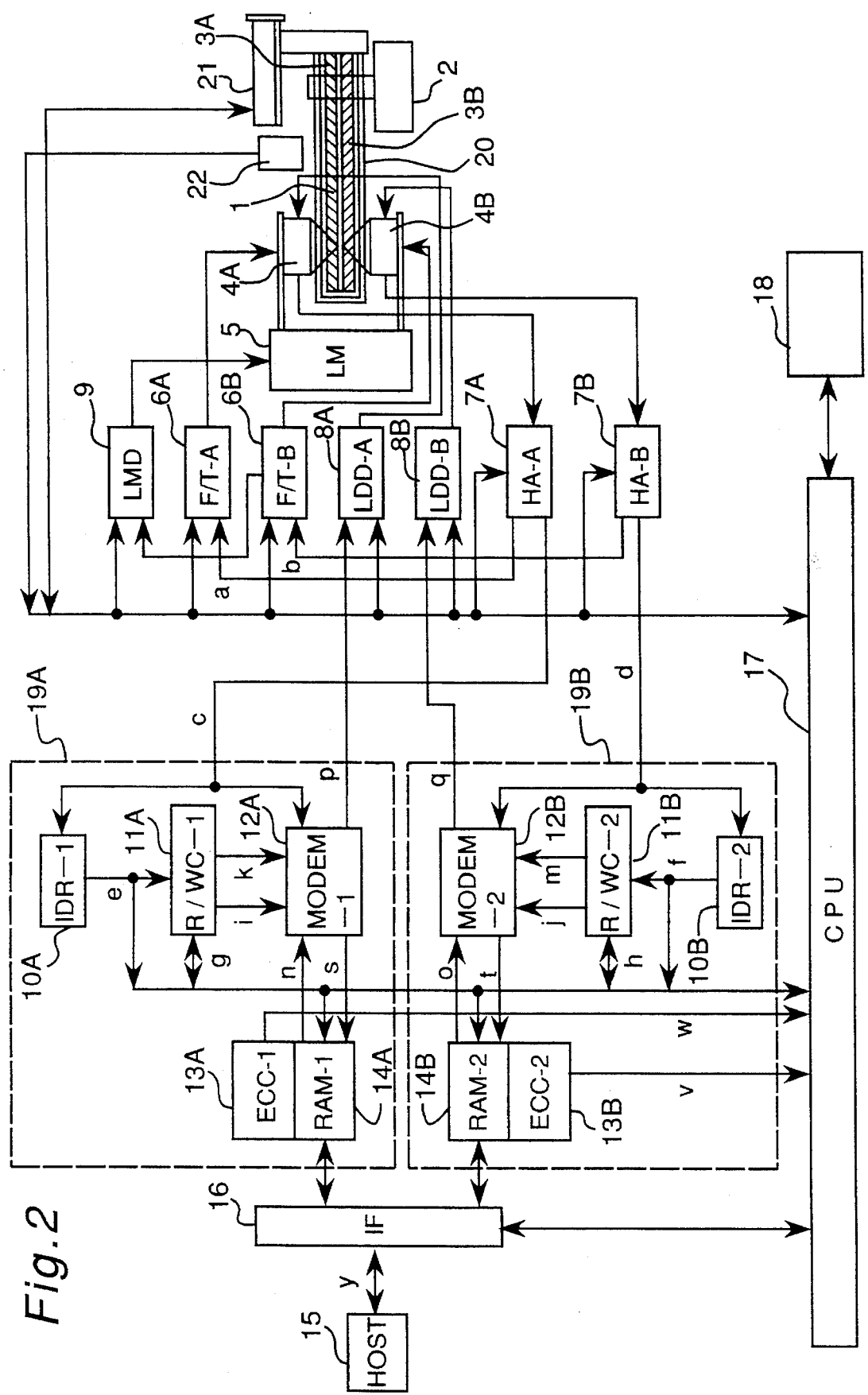
FIG. 2 is a block diagram of a write/read device of an embodiment of the present invention.

Referring now to the drawings, an embodiment of the present invention is explained below. FIG. 2 shows a block diagram of a write/read device of an embodiment according to the present invention. An optical disk 1 is kept in a cartridge 20, and a loading mechanism 21 loads the cartridge 21 to a rotation axis of the motor 2 or removes it from the rotation axis. The optical disk 1 is driven by a motor 2. Though the optical disk 1 shown in FIG. 2 is a double-sided optical disk, a single-sided optical disk may also be used. A double-sided optical disk has an A-side 3A and a B-side 3B. Marks such as sensor holes are provided on a surface of the cartridge 20 at prescribed positions for recognizing the data on the optical disk 1 such as single-sided or double sided optical disk and an A-side 3A or a B-side 3B, and a sensor 22 is mounted to detect the sensor holes. Two optical heads 4A and 4B are arranged oppositely with each other with respect to the optical disk 1, and the first and second optical heads 4A and 4B respectively converge and irradiate a laser beam onto a record layer of the optical disk 1 on the A- and B-sides. A servo system for optical head 4A comprises a head amplifier 7A, a laser driver circuit 8A, a linear motor 5, a linear motor controller 9 and a focusing and tracking controller 6A, while another servo system for optical head 4B comprises a head amplifier 7B, a laser driver circuit 8B, the linear motor 5, the linear motor controller 9 and a focusing and tracking controller 6B. The laser driver circuits (LDD-A, LDD-B) 8A and 8B drive laser diodes of the optical heads 4A and 4B to generate a laser beam. The linear motor (LM) 5 moves the optical head 4A and 4B to seek a target track, and the linear motor controller (LMD) 9 makes the optical heads 4A and 4B seek a target track with the linear motor 5. The focusing and tracking controller (F/T-A) 6A controls the focussing and tracking of the beam by the optical head 4A and for the retrace of a spiral track, while the other focussing and tracking controller (F/T-B) 6B controls the focussing and tracking of the beam by the optical head 4B and for the retrace of a spiral track. The head amplifiers (HA-A, HA-B) 7A and 7B amplify and digitize servo error signals "a", "b" and read signals "c", "d" of the optical heads 4A and 4B.

Data write/read circuits 19A and 19B comprise sector ID read circuits (IDR-1, IDR-2) 10A and 10B, sector write/read controllers (R/WC-1, R/WC-2) 11A and 11B, MODEMs (data modulation/demodulation circuits) 12A and 12B, error correction circuits (ECC-1, ECC-2) 13A and 13B and buffer memories (RAM-1, RAM-2) 14A and 14B. The sector ID read circuits 10A and 10B read track sector addresses "e" and "f" from a sector ID of the optical heads 4A and 4B. The sector write/read controllers 11A and 1ib compare the track sector addresses "e" and "f" with target sector addresses "g" and "h" to write/read data and generate write gate signals "i" and "j" or read gate signals "k" and "m". The MODEMs 12A and 12B modulate coded data "n" and "o" with a 2-7 RLLC (run length limited code) or the like to send modulated signals "p" and "q", while it demodulates read signals "c" and "d" to send demodulated signals "s" and "t". The error correction circuits 13A and 13B generate coded data "n" and "o" or a write data with error correction codes, and it verifies and corrects errors of the demodulated data "s" and "t". The buffer memories (RAM) 14A and 14B store temporary data. An interface (IF) 16 connects a host computer 15 through a SCSI (small computer system interface) bus "y". The microcomputer (CPU) 17 controls the entire write/read device using a memory 18.

The write operation of the write/read device shown in FIG. 2 is explained below. When the host computer 15 sends a write command through the SCSI bus "y" to the interface 16, the CPU 17 interprets the write command received by the interface 16 and sends a command to the linear motor driver 9 to drive the linear motor 5. The record data from the host computer 15 is stored in the buffer memories 14A and 14B, and the error correction circuits 13A and 13B send the coded data "n" and "o" which each includes an error correction code added to the record data. The CPU 17 sets a write sector address and a write command in the sector write/read controllers 11A and 11B. If the sector write/read controllers 11A and 11B detect the prescribed sector, write gate signals "i" and "j" are added to the MODEMs 12A and 12B and modulated signals "p" and "q" obtained by modulating the coded data "n" and "o" with 2-7 RLLC modulation are added to the laser drivers 8A and 8B. The optical head 4A writes the modulated signal "q" in a sector on the side 3A, while the optical head 4B writes the modulated signal "q" in a sector on the side 3B. The above-mentioned procedure is repeated for the prescribed number of sectors. Then, the CPU 17 reads the written sectors according to the procedure explained later, while monitoring error detection signals "v" and "w" from the error correction circuits 13A and 13B. The error detection signals "v" and "w" for sending the number of error bytes per error correction code are generated by a syndrome detection block of the error detection circuits 13A and 13B. If the number of error bytes is smaller than the prescribed standard, it is determined that the write operation has been correctly performed, and otherwise it is determined that the write operation was not correctly performed due to defects of the optical disk, inappropriate laser power or the like. If the write operation has been improperly performed, an alternate processing is performed to record the data of the sector in an alternate good sector.

The read operation of the above-mentioned embodiment is explained below. When the host computer 15 sends a read command to the SCSI bus "y", the CPU 17 interprets the read command received by the interface 16 and sends a command to the linear motor driver 9 for making the optical heads 4A and 4B seek the target track so as to drive the linear motor 5. The CPU 17 sets a read sector address and a read command in the sector write/read controllers 11A and 11B. If the sector write/read controllers 11A and 1ib detect the prescribed sector, a read gate signals "k" and "m" are added to the MODEMs 12A and 12B. The read signal "c" in the side 3A from the optical head 4A is demodulated by the MODEM 12A and the demodulated data "s" is stored in the buffer memory 14A, while the read signal "d" in the side 3B from the optical head 4B is demodulated by the MODEM 12B and the demodulated data "s" is stored in the buffer memory 14B. The error correction circuits 13A and 13B correct the errors in the demodulated data "s" stored in the buffer memories 14A and 14B and the corrected data is stored again in the buffer memory 14A, 14B. The read data after the error correction is sent through the interface 16 to the host computer 15. The above-mentioned read operation is repeated for a predetermined number of sectors.

Figure 1:
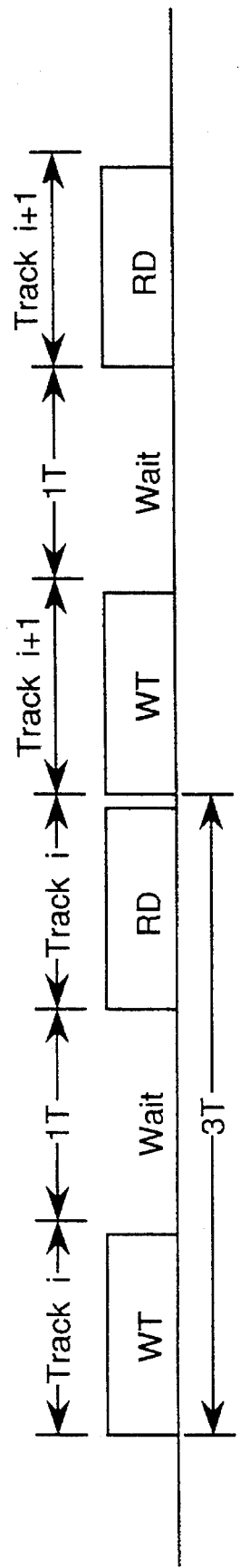
FIG. 1 is a timing chart of a prior art optical information write/read device.
Figure 3:
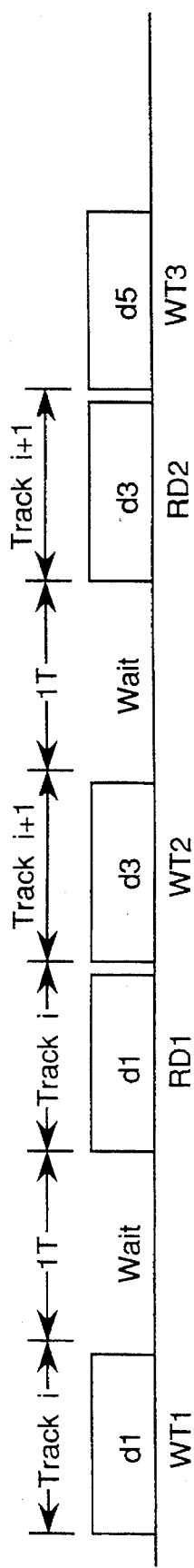
FIG. 3 is a timing chart of a write verify operation.
Figure 3:
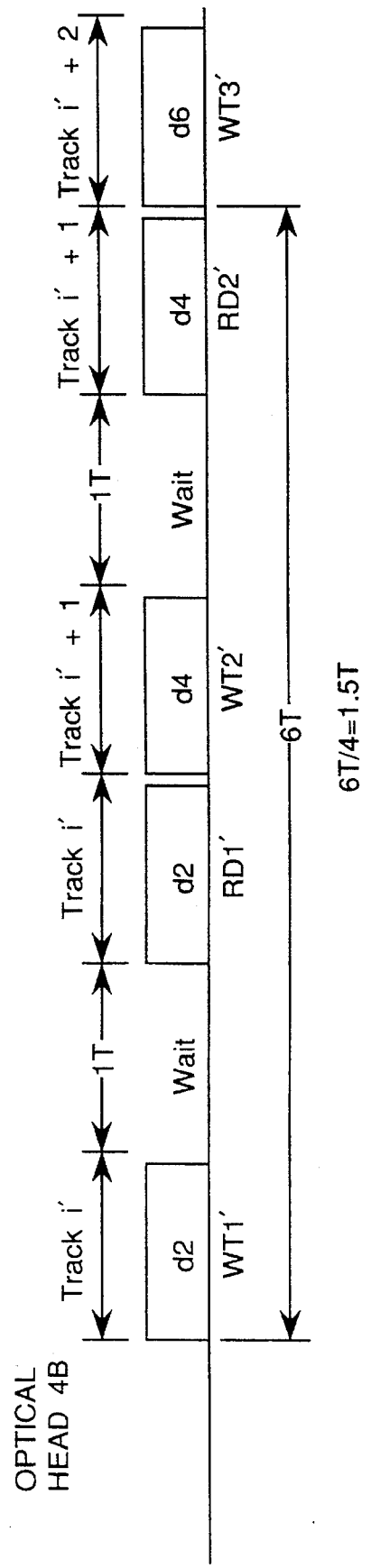

FIG. 3 is an example of a timing chart in a write verify mode of the write/read device shown in FIG. 2, wherein data is continuously recorded on an optical disk. In FIG. 3, the upper chart relates to data write/read with the optical head 4A, while the lower chart relates to data write/read with the optical head 4B. The data write is performed on a track by track basis. Data to be written are divided into successive pieces of data "d1", "d2", "d3", . . . each with a memory capacity equal to that of one track, and they are written by the two optical head 4A and 4B simultaneously. Then, they are distributed to the two optical heads, that is, pieces of data "d1", "d3", "d5", . . . are supplied to the optical head 4A and pieces of data "d2", "d4", "d6", . . . are supplied to the optical head 4B alternately. The data are handled by the data write/read circuits 19A and 19B for two independent channels, and the two optical heads 4A and 4B handle data alternately for the side 3A and for the other side 3B of an optical disk 1, in order to process the read for write and check simultaneously in parallel The pieces of data "d1", "d3", "d5", . . . and the pieces of data "d2", "d4", "d6", . . . from the host computer 15 are stored in the buffer memories 14A and 14B by the distribution by the interface 16 under the control of the CPU 17. For each optical head 4A and 4B, after data of a track is written, a write verify of the written data is performed. In this example, after the optical head 4A writes data, the other optical head 4B begins to write data while the optical head 4A performs write verify. Therefore, as shown in FIG. 3, data of four tracks "i", "i+1", "i'" and "i'+1" can be written during six disk revolutions (6 T) wherein T denotes disk revolution time. Then, the average write time per track is 1.5 T (= 6 T/4), which is half that of the prior art example shown in FIG. 1.

Figure 4:
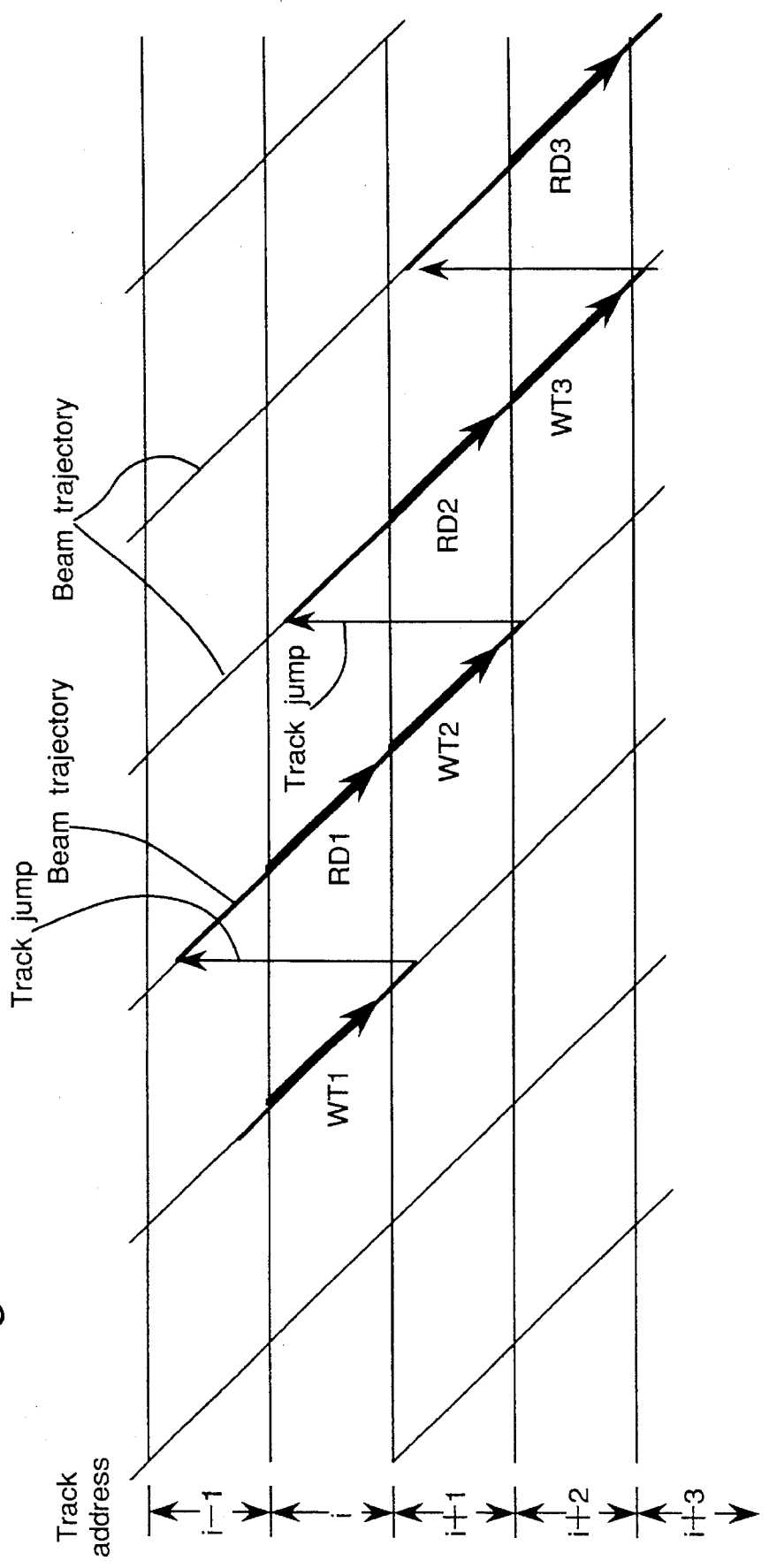
FIG. 4 is a diagram of a tracking trajectory of a spiral track of an optical beam in a write verify mode.

FIG. 4 illustrates an example of tracking a trajectory for the spiral track of the optical head 4A, wherein the abscissa denotes time and the ordinate denote track or position, The trajectories of the optical beams for the tracks "i−1" to "i+3" are illustrated by oblique lines. Bold lines mean trajectories of the optical beam of the optical head 4A. Data "d1" is written in a time denoted as "WT1". At the top of the track "i+1", the optical head 4A jumps back to the previous track "i−1" and after a wait time of 1 T, it traces the track "i" again to read and check the written data "d1" for a write verify in a read time denoted as "RD1". The above-mentioned procedure is repeated as many times as needed. In this case, the data "d3" can be written readily in the next track "i+1". Though not shown explicitly, the optical head 4B performs the write verify similarly by tracing the tracks "i'−1", "i'" and the like in the side 3B with a beam as to the data "d2", "d4" and "d6".

If an optical disk 1 is inserted inversely compared with a case explained above, the side 3A opposes the optical head 4B, while the side 3B opposes the optical head 4A. If the reverse insertion is detected from the sensor holes of the cartridge 20 by the sensor 22, the data "d1"–"d6" are distributed inversely from the above-explained case.

Figure 5A:
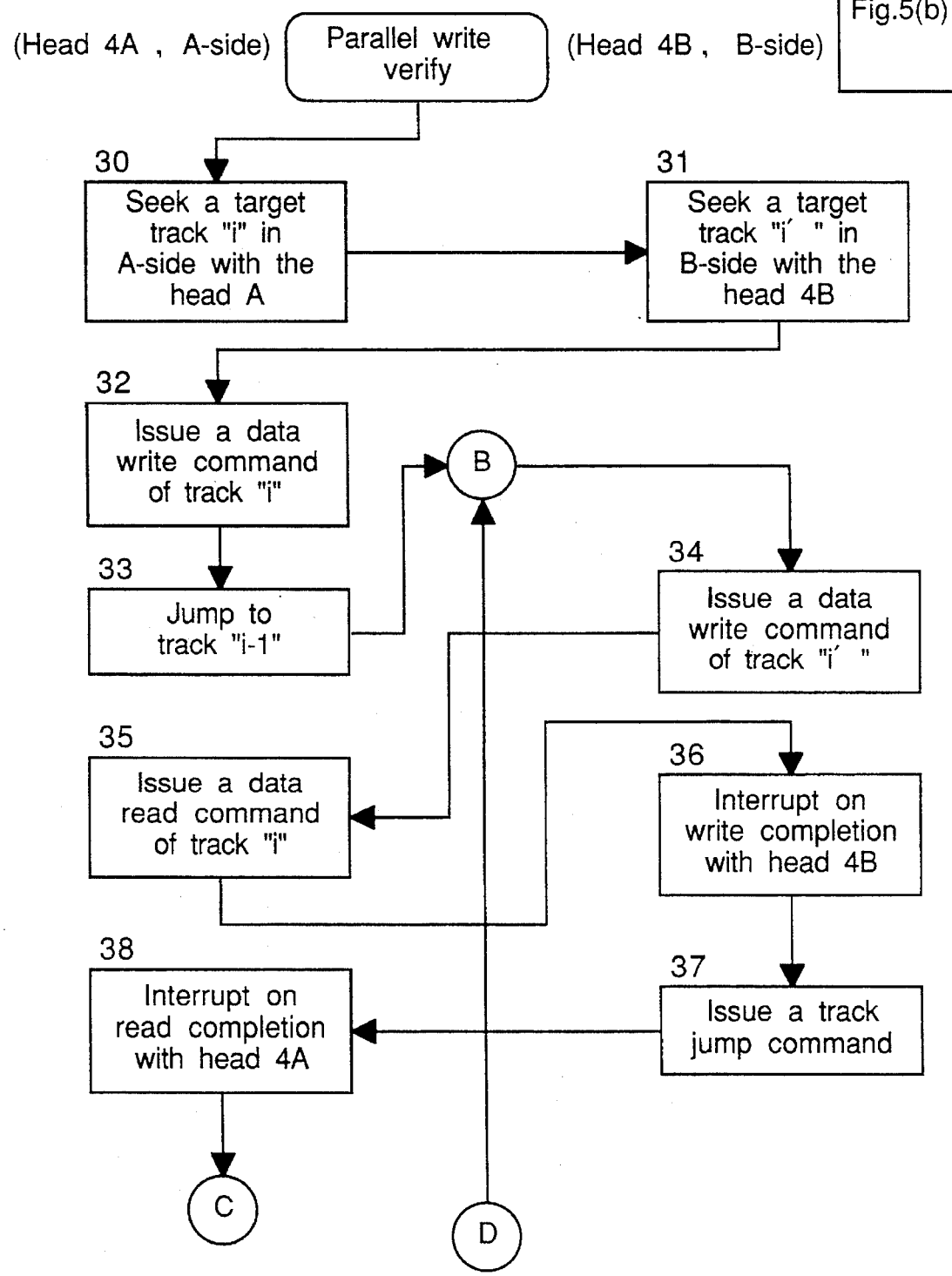
FIGS. 5(a) and 5(b) is a flowchart of a write verify operation at high speed for a double-sided optical disk.
Figure 5A:
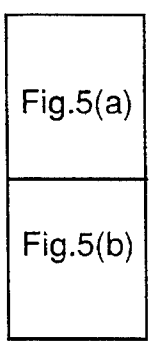
Figure 5B:
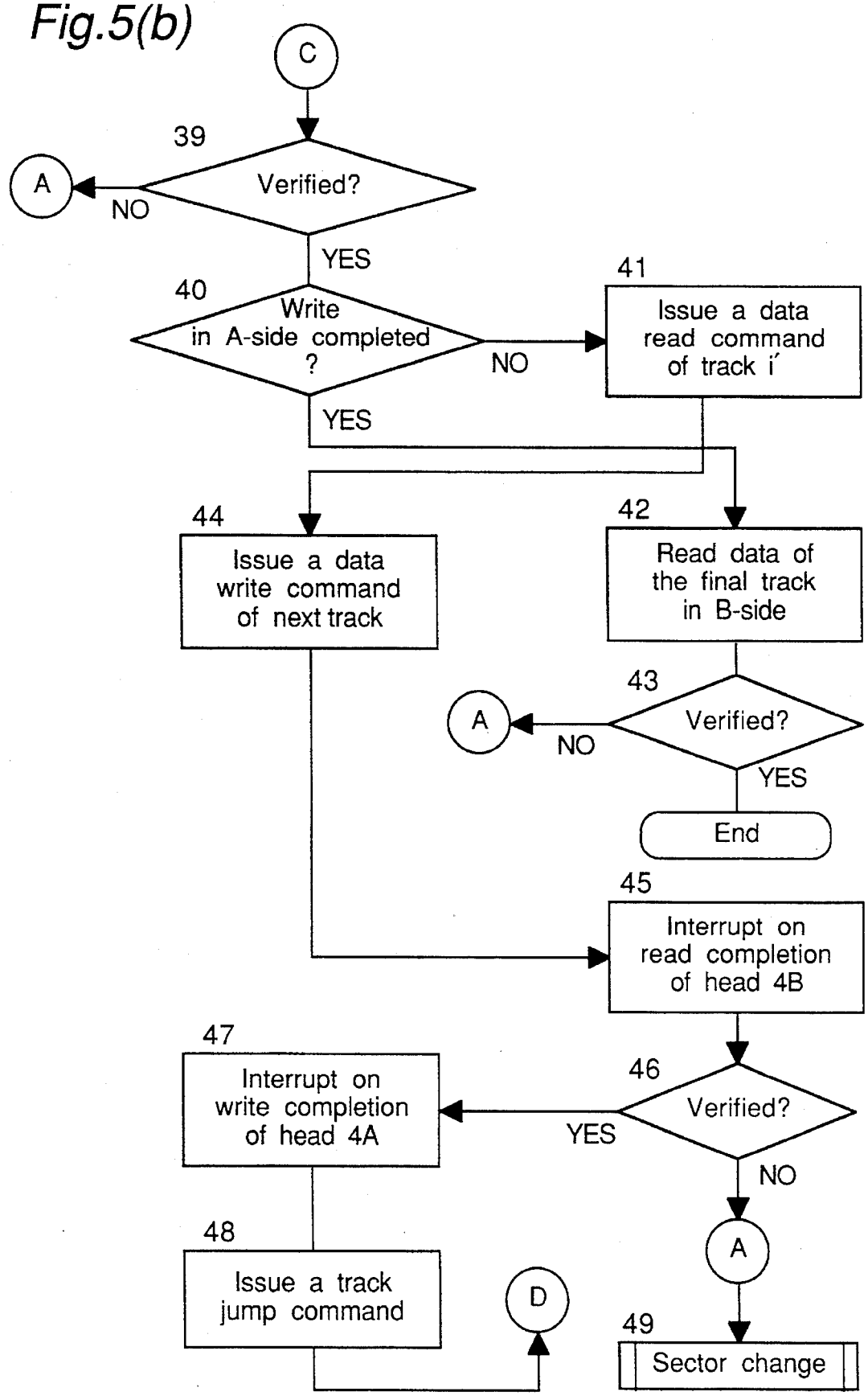

FIGS. 5(a) and 5(b) together form a flowchart of a parallel write verify as illustrated above using FIGS. 3 and 4. In the write verify explained below, it is assumed that a write operation is effected on a track by track basis and that the optical disk comprises a plurality of tracks for simplicity of explanation. The data write/read circuits 19A and 19B for channel one and two write or read data automatically after the top address and the sector number therefor are set and send an interrupt on write/read completion to the CPU 17, respectively. Thus, the write/read of the optical heads 4A and 4B is controlled in parallel in real time.

In FIGS. 5(a) and 5(b), the left side relates to write verify with the optical head 4A for side 3A, while the right side relates to write verify with the optical head 4B for side 3B. First, the CPU 17 makes the optical head 4A seek a track "i" in the side 3A, and the optical head 4A accesses the track "i" (step S30). On the other hand, the CPU 17 also makes the other optical head 4B seek a track "i'" in the other side 3B and the optical head 4B accesses the track "i'" (step S31).

Next, the CPU 17 issues a write command to the data write/read circuit 19A for writing data "d1" stored in the buffer memory 14A in the target track "i" (step S32). Then, if the sector of the track is detected by the R/W controller 11A, the data write/read circuit 19A adds error correction code to the data of the memory 14A and the obtained data are modulated by the MODEM 12A and written through the laser driver 8A by the optical head 4A in the optical disk 1. After the write, a jump command is issued to the focussing and tracking circuit 6A and the optical head 4A jumps to the previous track "i−1" (step S33).

Then, the CPU 17 issues a write command to the data write/read circuit 19B for writing data "d2" stored in the memory 14B in the track "i'" (step S34). Then, if the sector of the track is detected by the R/W controller 11B, the data write/read circuit 19B adds error correction code to the data of the memory 14B and the obtained data are modulated by the MODEM 12B and written through the laser driver 8B by the optical head 4B in the optical disk 1.

On the other hand, the CPU 17 issues a command to the data write/read circuit 19A for reading the written data "d1" in the track "i" in the side 3A (step S35). Then, if the sector of the track is detected by the R/W controller 11A, the read data of the head 4A is demodulated by the MODEM 12A and the number of errors are detected from an error flag of the error correction circuit 13A.

The CPU 17 detects the completion or write of the data "d2" in the track "i'" from an interrupt on write completion of the data write/read circuit 19B (step S36). Then, the CPU 17 issues a jump command to the focussing and tracking circuit 6B for jumping the optical head 4B to the track before the last track (step S37), and the focussing and tracking circuit 6B traces the previous track "i'−1".

On the other hand, after the completion of read of the data write/read circuit 19A (step S38), the CPU 17 knows the number of errors in the read data from an error flag of the error correction circuit 13A and checks if the number is within a predetermined permissible range (step S39). If the number of errors is determined to exceed the predetermined number, the sector alternate processing is performed (step S49) to write the data of the defective track again from the memory 14A in a spare sector.

A check is performed to determine if the write in the track in the side 3A is completed (step S40), and if the write in the side 3A is determined not to be completed, the CPU 17 issues a read command to the data write/read circuit 19B for verifying the data "d2" written in the track "i'" in the side 3B (step S41). If the sector of the track is detected by the R/W controller 11B, the read data of the head 4A is demodulated by the MODEM 12B and the number of errors are detected by the error correction circuit 13B (step S42).

On the other hand, if the write in the side 3A is not completed, the CPU 17 issues a data write command to the data write/read circuit 19A for writing data "d4" in a next track "i+1" (step S44). If the sector of the track is detected by the R/W controller 11A, the data write/read circuit 19A adds error correction code to the data of the memory 14A and the obtained data are modulated by the MODEM 12A and written through the laser driver 8A by the optical head 4A in the optical disk 1.

If the CPU 17 detects the completion of read from an interrupt on read completion sent from the data write/read circuit 19B (step S45), the number of errors of the read data is checked (step S46). If the number of errors is determined to exceed the predetermined number, the sector change processing is performed (step S49) to write the data of the defective track again from the memory 14A in a spare sector.

If the number of errors is determined not to exceed the predetermined number (YES at step S46), when the CPU 17 detects an interrupt on data write completion from the data write/read circuit 19B (step S47), the CPU 17 issues a track jump command to move the optical head 4A back to the track before the last track (step S48). Then, the flow returns to step S34 and the CPU 17 issues a write command to the data write/read circuit 19B for writing data "d2" stored in the memory 14B in the track "i'". When the data write in the track in the side 3A, the CPU 17 reads the final track in the side 3B, and checks the number of errors. If the write verify is completed normally according to the number of detected errors, all the processing is completed. If the write verify is not completed normally, the sector change processing (step S49) is performed.

If the write in the side 3A is determined to be completed at step S40, the data write/read circuit 19B reads the data in the final track in the side 3B (step S42). After the completion of read of the data write/read circuit 19B, the CPU 17 detects the number of errors in the read data from an error flag of the error correction circuit 13A and checks if the number of errors is within a predetermined permissible range (step S43). If the number of errors is determined to exceed the predetermined number, a different spare sector is selected for writing the data (step S49). If the number of errors is within the predetermined permissible range, the write verify is completed.

As explained above, when data has been written in sectors of a predetermined track in the side 3A or 3B of a double-sided optical disk 1, the written data is read readily from the sector and the errors of the demodulated data are checked for write verify. In parallel, the other optical head 4B writes next data in the other side 3B or 3A using a write verify. Thus, the write time can be reduced by half.

Because two optical heads are used for each side of a double-sided optical disk, data can be written without reversing the optical disk, and the on line capacity can be doubled.

In the above-mentioned example, write verify is checked by using the number of errors of written data. However, the check may be performed for example by comparing the written data with the original data.

In the above-mentioned example, when a write verify is performed on a side 3A or 3B, data write is performed on the other side 3B or 3A. However, data write may be performed on the two sides simultaneously, while the write verify may also be performed on the two sides simultaneously. In this case, the data for the two sides are written after they are stored once in a memory.

In the above-mentioned example, the capacity of the buffer memories 14A and 14B is one track. However, it may be increased, for example, to a few sectors or a few tracks.

In contrast to the above-mentioned example, the first and second optical heads may be arranged on the same side of the optical disk. In this case, a single-sided optical disk can also be used.

In the above-mentioned example, the computer 18a is used to control the timing sequence of data write with optical heads. However, it may be replaced by a hard-wired logic.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A write/read device comprising:
    a drive mechanism for supporting and driving an optical disk;
    a first optical head means for writing and reading data on the optical disk supported by said drive mechanism;
    a first servo means for focusing an optical beam generated by said first optical head on a first record side of the optical disk;
    a first data write means for writing data on said first record side;
    a first data read and check means for reading the data written by said first data write means and for checking for errors of the written data;
    a second optical head means for writing and reading data on the optical disk supported by said drive mechanism, second optical head means being arranged at an opposite side to said first optical head means with respect to the optical disk supported by said drive mechanism;
    a second servo means for focusing an optical beam from said second optical head on a second record side of said optical disk;
    a second data write means for writing data on said second record side;
    a second data read and check means for reading the data written by said second data write means and for checking for errors of the written data;
    a head shift means for simultaneously moving said first and second optical heads; and
    a control means for making said first data read and check means check for errors while said second data write means writes data and for making said second data read and check means check for errors while said first data write means writes data.

2. The write/read device according to claim 1, wherein said optical disk is a disk medium having a spiral track for writing data and said first and second data write means and said first and second data read and check means writes, reads and checks data on a track by track basis.

3. The write/read device according to claim 1, wherein said first and second data read and check means each check for errors by comparing the read data with the original data.

4. The write/read device according to claim 1, wherein said first and second data read and check means each check for errors comparing the number of errors by using an error detection correction code.

5. A method for writing and reading data on a double-sided optical disk, the method comprising:
    a first step of writing data with a first optical head on a first record side of an optical disk;
    a second step of reading the data written by the first optical head with the first optical head and checking the quality of the recorded data;
    a third step of writing data with a second optical head on a second record side of the optical disk; and
    a fourth step of reading the data written by the second optical head with the second optical head and checking the quality of the recorded data;
    wherein said first step using the first optical head is performed simultaneously with said fourth step using the second optical head and wherein said third step using the second optical head is performed simultaneously with said second step using the first optical head and wherein the first and second optical heads are moved simultaneously.

6. The method according to claim 5, wherein the checking of the written data in said second and fourth step is performed by comparing the written data with the original data.

7. The method according to claim 5, wherein the checking of the written data in the second and fourth step is performed comparing the number of errors by using an error detection correction code.

8. The method according to claim 5, wherein said first, second, third and fourth steps are performed on a track by track basis.

9. A write/read device comprising:
    a drive mechanism for supporting and driving an optical disk;
    a first optical head means for writing and reading data on the optical disk supported by said drive mechanism;
    a first servo means for focusing an optical beam generated by said first optical head on a side of the optical disk;

a first data write means for writing data on said side of the optical disk;

a first data read and check means for reading the data written by said first data write means and for checking for errors of the written data;

a second optical head means for writing and reading data on the optical disk supported by said drive mechanism, second optical head means being arranged on the same side as said first optical head means with respect to the optical disk supported by said drive mechanism;

a second servo means for focusing an optical beam from said second optical head on said side of said optical disk;

a second data write means for writing data on said side of the optical disk;

a second data read and check means for reading the data written by said second data write means and for checking for errors of the written data;

a head shift means for simultaneously moving said first and second optical heads; and a control means for making said first data read and check means check for errors while said second data write means writes data and for making said second data read and check means check for errors while said first data write means writes data.

10. The write/read device according to claim 9, wherein said optical disk is a disk medium having a spiral track for writing data and said first and second data write means and said first and second data read and check means writes, reads, and checks data on a track by track basis.

11. The write/read device according to claim 9, wherein said first and second data read and check means each check for errors by comparing the read data with the original data.

12. The write/read device according to claim 9, wherein said first and second data read and check means each check for errors by comparing the number of errors using an error detection correction code.

13. A method for writing and reading data on an optical disk, the method comprising:

a first step of writing data with a first optical head on a side of an optical disk;

a second step of reading the data written by the first optical head with the first optical head and checking the quality of the recorded data;

a third step of writing data with a second optical head on the side of the optical disk; and a fourth step of reading the data written by the second optical head with the second optical head and checking the quality of the recorded data;

wherein said first step using the first optical head is performed simultaneously with said fourth step using the second optical head and wherein said third step using the second optical head is performed simultaneously with said second step using the first optical head and wherein the first and second optical heads are moved simultaneously.

14. The method according to claim 13, wherein the checking of the written data in said second and fourth step is performed by comparing the written data with the original data.

15. The method according to claim 13, wherein the checking of the written data in the second and fourth step is performed by comparing the number of errors using an error detection correction code.

16. The method according to claim 13, wherein said first, second, third and fourth steps are performed on a track by track basis.

* * * * *